2 Sheets--Sheet 1.

D. SPECK.

Improvement in Apparatus for Bolting Flour.

No. 129,611. Patented July 16, 1872.

Witnesses.
A. Ruppert.
Wm M Lynch

Inventor.
David Speck
Edson Bros.
Atty

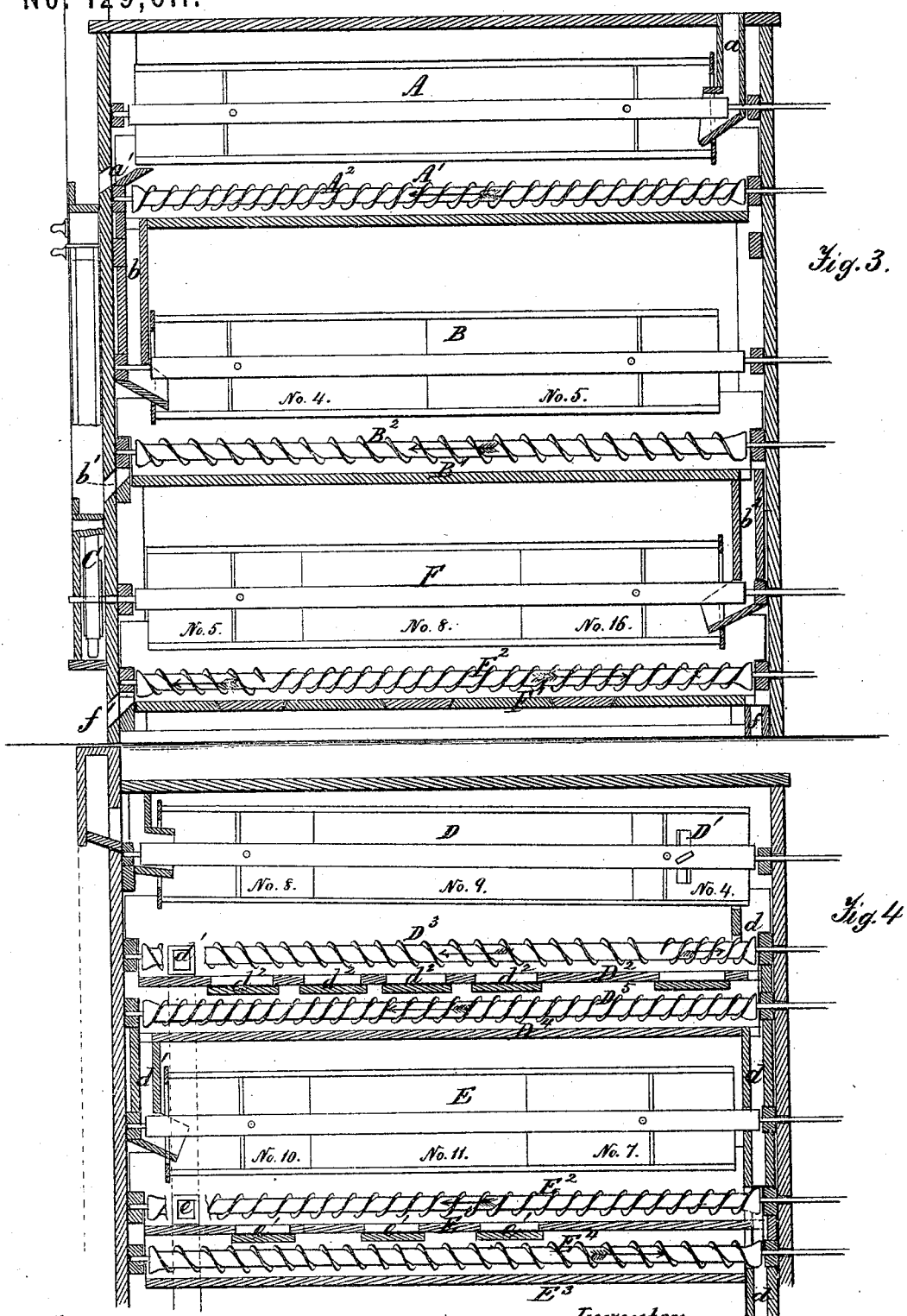

UNITED STATES PATENT OFFICE.

DAVID SPECK, OF WEAVERTON, MARYLAND.

IMPROVEMENT IN APPARATUS FOR BOLTING FLOUR.

Specification forming part of Letters Patent No. 129,611, dated July 16, 1872.

Specification describing certain Improvements in Bolting Flour, invented by DAVID SPECK, residing at Weaverton, in the county of Frederick and State of Maryland.

My invention consists in certain novel combinations and arrangements of parts, which will be more generally explained in the ensuing description, and specifically pointed out in the claims.

Figure 1:
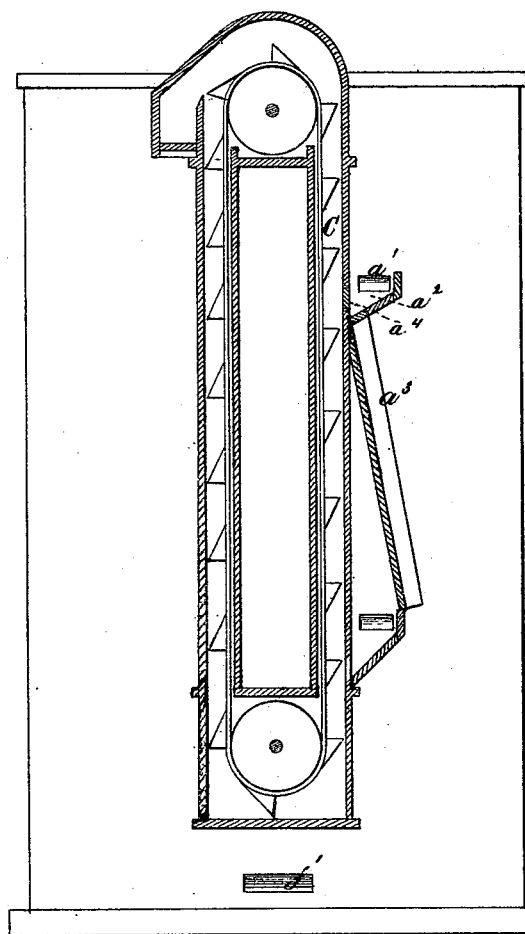
Figure 2:
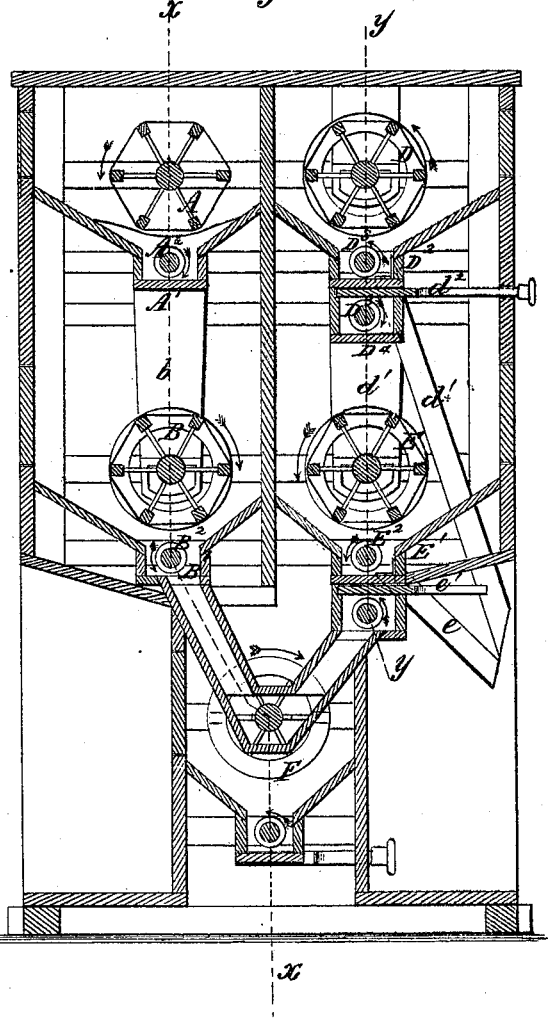

Figure 1 represents an end elevation, showing the elevator in section. Fig. 2 is a transverse section. Fig. 3 is a longitudinal section in a plane indicated by line $x\ x$ in Fig 2. Fig. 4 is also a longitudinal section, but on line $y\ y$ of Fig. 2.

The same letters of reference are employed in all the figures in the designation of identical parts.

The meal from the cooling-room enters the bolt through the spout $a$, and is delivered into the head-end of the first reel A, which is made of wire-cloth of uniform fineness throughout, and is intended to separate the coarse bran from the meal. The meal sifts through the wire-cloth and falls into the trough $A^1$, while the bran passes to the tail-end of the reel and is discharged through the chute $a^1$ into a box, $a^2$, (see Fig. 1,) from which it may all be directed into the discharge-spout $a^3$; or portions of it may be passed through the slide $a^4$ into the elevator, for purposes soon to be described. The trough $A^1$ contains a screw-conveyer, which carries the meal sifted through the wire reel A into the spout $b$, from which it falls into the second reel B, located beneath the first reel. The finer portions of the bran are here separated from the meal, which sifts through the bolting-cloth of the reel B, and is caught up by the trough $B^1$ and delivered by the conveyer $B^2$ through the chute $b^1$ into the elevator C, the buckets of which carry it up and dump it into a box, $c'$, to be passed from there into the head-end of the third or merchant reel D. The tailings from the reel B pass through the spout $b^2$ into the last reel F of the series, and are finally discharged from the tail-end of such reel into a suitable receptacle. The merchant-reel D is covered with fine bolting-cloth, and makes flour of the best quality up to near its tail-end, which is covered with a coarser kind of cloth, to permit the finer particles of offal extracted from the flour in this reel to sift through. In damp weather the meal absorbs or takes up a good deal of moisture from the atmosphere, and in consequence becomes somewhat compact, and is apt to close up the meshes of the bolting-cloth of the merchant-reel, owing to which some flour will find its way to the tail-end of the reel and escape, mingled with the offal, causing considerable loss. In order to overcome this difficulty, I propose, when the state of the atmosphere calls for it, to pass some of the coarse bran into this merchant-reel D for the purpose of clearing the meshes of the cloth of any flour which may become lodged in them. The bran is obtained from the box $a^2$ by opening the slide $a^4$, and entirely or partly closing the slide over the discharge-spout $a^3$, the bran thus caused to enter the elevator being carried up, together with the meal from the reel B, to the merchant-reel D. $D^1$ is a fan attached to the shaft of the reel D, to induce a slight current, for the purpose of imparting greater agitation to the bran, and aiding in its motion toward the tail-end of the reel. The bran is discharged through the spout $a$. The flour falls into the trough $D^2$, the conveyer $D^3$ of which carries it to the spout $d^1$ ready for packing. The offal sifting through the coarse portion of this reel is forced by reverse screw-threads upon the conveyer-shaft to the spout $d$, as shown in Fig. 4. All the flour sifting through this reel may not be of the standard quality, and contain minute specks of offal; therefore, to provide for a separation of such specky flour, a series of slides, $d^2$, is arranged in the bottom of the trough $D^2$, either one of which, if necessary, may be opened to let the flour sifting through the reel, in rear of such opened slide, fall into the trough $D^4$ beneath, by the conveyer $D^5$, by which it will be passed to the spout $d^1$ to be delivered into the fourth reel E for further separation. The tailings from this reel E fall into the spout $d$, and so much of the flour as is up to the standard desired is directed by the conveyer $E^2$ in the trough $E^1$ into the spout $e$ to be packed with the flour issuing from the spout $d^1$; the rest of the flour deemed below the standard falling through either one of the slides $e'$ in the bottom of the trough $E^1$ into another trough, $E^3$, beneath, to be carried by the conveyer $E^4$ therein to the spout $d$, from which it passes, mingled with the bran and other offal, into the last reel F. The remaining flour, or rather middlings, is here separated from as much offal as possible and carried by the left-handed screw-threads of the conveyer $F^2$ in the trough $F^1$ to the discharge-spout $f$, while the offal is forced by the right-handed screw-thread to the chute $f'$, and the bran passes off as tailings.

What I claim as my invention, and desire to secure by Letters Patent, is—

1. In combination with the merchant-reel D, the fan $D^1$, when arranged as and for the purpose set forth.

2. The combination and arrangement of the reel A, spout $a^1$, box $a^2$, bran-slide $a^4$, elevator $c$, and reel D, substantially as and for the purpose specified.

3. The series of reels A, B, D, and E, the conveyers $A^2$, $B^2$, $D^3$, and $E^2$, slides $d^2$ and $e'$, spout $a^1$, bran-slide $a^4$, and elevator C, all combined and arranged to operate substantially as described, and for the purpose set forth.

In testimony whereof I have hereunto set my hand this 27th day of February, A. D. 1872, in presence of two subscribing witnesses.

DAVID SPECK.

Witnesses:
   JOS. R. EDSON,
   J. W. MISTER.